United States Patent
Martin Moreno et al.

(10) Patent No.: US 9,623,958 B2
(45) Date of Patent: Apr. 18, 2017

(54) METHOD FOR CONTROLLING AN AIRCRAFT PROPELLER SYSTEM DURING THRUST REVERSAL

(71) Applicant: AIRBUS DEFENCE AND SPACE, S.A., Madrid (ES)

(72) Inventors: Miguel Angel Martin Moreno, Madrid (ES); Eva Carlon Ortiz, Madrid (ES); Manuel Silvestre Salas, Madrid (ES); Vincent Lamonzie, Madrid (ES)

(*) Notice: Subject to any disclaimer, the term of this patent is extended or adjusted under 35 U.S.C. 154(b) by 0 days.

(21) Appl. No.: 14/934,631

(22) Filed: Nov. 6, 2015

(65) Prior Publication Data

US 2016/0121998 A1 May 5, 2016

(30) Foreign Application Priority Data

Nov. 7, 2014 (EP) .................................... 14382443

(51) Int. Cl.
*B64C 11/30* (2006.01)
*B64C 11/46* (2006.01)
(Continued)

(52) U.S. Cl.
CPC ............ *B64C 11/305* (2013.01); *B64C 11/46* (2013.01); *B64D 31/02* (2013.01); *B64D 31/10* (2013.01); *B64D 31/12* (2013.01)

(58) Field of Classification Search
CPC ....... B64C 11/305; B64C 11/46; B64D 31/10; B64D 31/12; B64D 31/02
See application file for complete search history.

(56) References Cited

U.S. PATENT DOCUMENTS 2,731,094 A * 1/1956 Hine .................... B64C 11/325
416/34
2,860,554 A 11/1958 Shields
(Continued)

FOREIGN PATENT DOCUMENTS

BE 634854 A 11/1963
CA 965387 4/1975
(Continued)

OTHER PUBLICATIONS

Supplementary European Search Report; Dated Jun. 29, 2015, 6 Pages.

*Primary Examiner* — Michael J Zanelli
(74) *Attorney, Agent, or Firm* — Dickinson Wright PLLC

(57) ABSTRACT

The present invention refers to a method for controlling an aircraft propeller system during thrust reversal, wherein it is checked whether each power plant is ready for the transition to negative pitch, and where the propellers transition to negative pitch is controlled from a flight control system, such as only when both power plants are ready for the transition to negative pitch, the flight control system instructs the aircraft propeller system to reverse thrust. If a power plant failure is detected before a reversal order is received, then the flight control system is informed of that failure condition, and then the flight control system will disable the thrust reversal operation as long as the failure condition remains. The method of the invention improves the aircraft controllability during landing operations, reduces pilot workload, and improves passenger comfort during landing and taxing.

4 Claims, 2 Drawing Sheets

(51) Int. Cl.
    *B64D 31/10*     (2006.01)
    *B64D 31/12*     (2006.01)
    *B64D 31/02*     (2006.01)

(56) References Cited

U.S. PATENT DOCUMENTS

| | | | |
|---|---|---|---|
| 3,070,173 A * | 12/1962 | Toulmin, Jr. | B64C 11/301 |
| | | | 318/480 |
| 3,350,836 A | 11/1967 | Dillon et al. | |
| 3,750,929 A | 8/1973 | Flanagan | |
| 3,760,557 A | 9/1973 | McIntyre | |
| 4,878,337 A | 11/1989 | Raudat et al. | |
| 5,927,655 A * | 7/1999 | Larramendy | B64D 31/10 |
| | | | 244/195 |
| 2007/0110577 A1* | 5/2007 | Danielson | B64C 11/303 |
| | | | 416/1 |
| 2009/0297348 A1* | 12/2009 | Neitzke | B64C 11/325 |
| | | | 416/140 |

FOREIGN PATENT DOCUMENTS

| | | | |
|---|---|---|---|
| DE | 2206142 A1 | 8/1973 | |
| FR | 1467953 A | 2/1967 | |

\* cited by examiner

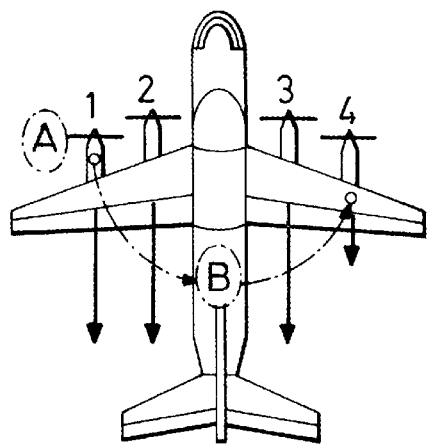
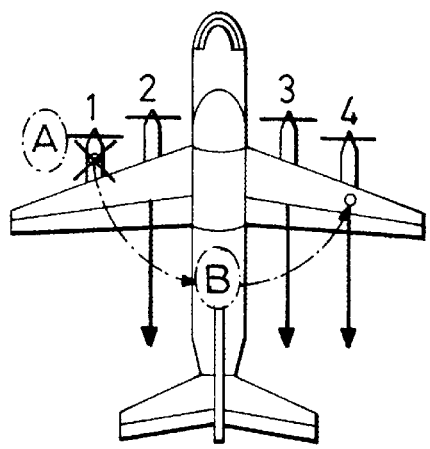
FIG.1A  FIG.1B
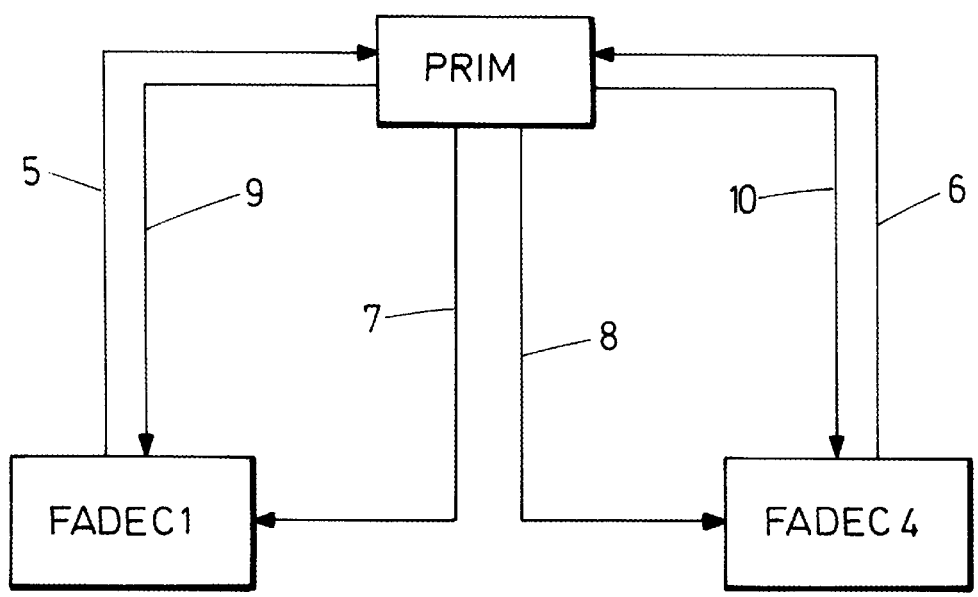
FIG.2

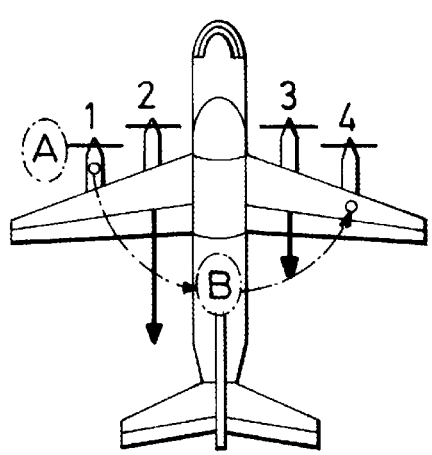
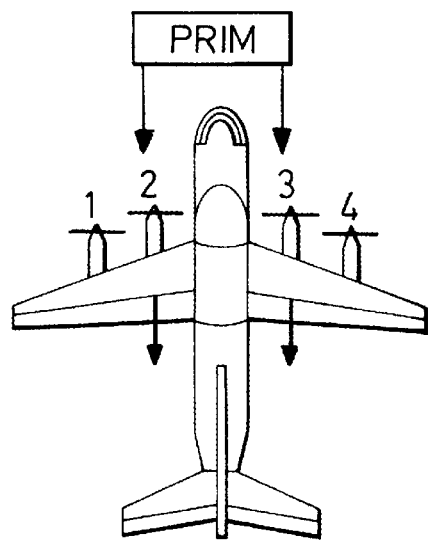
FIG.3A  FIG.3B
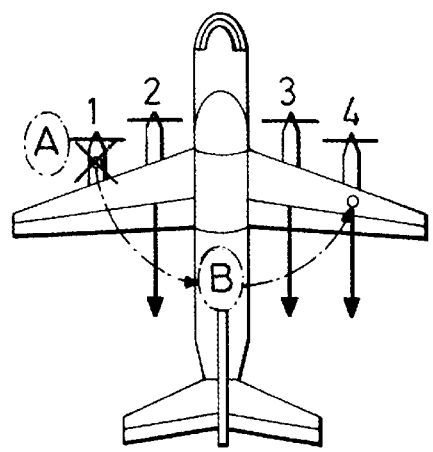
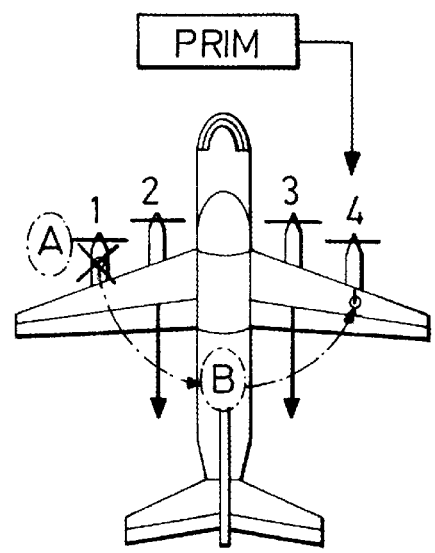
FIG.4A  FIG.4B

METHOD FOR CONTROLLING AN AIRCRAFT PROPELLER SYSTEM DURING THRUST REVERSAL

CROSS-REFERENCE TO RELATED APPLICATIONS

The present application claims priority to European Application No. 14382443.1 filed on Nov. 7, 2014, and is hereby incorporated by reference, as though set forth fully herein.

FIELD OF DISCLOSURE

The present invention refers in general to aircraft propeller control systems, and in particular to a technique for controlling the transition of the propellers pitches from forward thrust to reverse thrust during landing and taxing.

An object of the present invention is to provide a method for controlling the aircraft propellers blade pitch during the thrust reversal operation, which assures the simultaneous transition to reverse thrust in opposite propellers (outboard and/or inboard pairs), in order to improve the aircraft controllability during landing operations, reduce pilots workload, and to improve passengers comfort during landing and taxing.

BACKGROUND OF THE DISCLOSURE

Variable-pitch propellers are widely used in many differing types of aircrafts having power plants ranging from piston engines to gas turbines. Reversing the propellers thrust provides braking power after the aircraft touches down during a landing maneuver, which is especially useful for example, for military transport aircrafts that occasionally need to land in provisional short runways.

During forward flight, the propeller blades are positioned to have positive pitch to provide forward thrust for the airplane. To speed down the aircraft during landing, or to facilitate pivot turns during taxing, the propellers thrust is reversed, such as the propeller blades are rotated about their axes until they have negative pitch angle to provide reverse thrust.

Normal practice is to rely on the pilot skills for the transition to the high drag reverse propeller pitch and the synchronization in opposite power plants. Typically, for the thrust reversal operation the pilot first changes the throttle lever position in order to reduce fuel flow to the engine to reduce engine speed. Then, the pilot reverses the pitch of the propellers and after that, the pilot restores the throttle lever to a position of higher fuel flow in order to resume a higher engine speed. During this operation, the pilot monitors the speed of the engine in order to assure that neither the speed of the engine nor that of the propeller becomes excessive.

However, this practice is subject to human errors because it relies entirely on the pilots skills, and does not prevent other asymmetries caused by delays due to engine/propeller response to control commands or malfunctions.

As a result, yaw moments can then be generated creating discomfort and, most importantly, compromising the aircraft safety and increasing the pilots workload to keep the aircraft within the runway.

Discomfort and yaw is magnified in aircrafts having four power plants due to the larger distance between the outboard engines. In many cases the solution is to enlarge the aircraft vertical tail but this solution has a significant impact in weight, fuel consumption, and aircraft performance.

Even being of less magnitude, yaw is also produced by the asymmetry created between the two inboard engines in a four engine aircraft and in a two engine aircraft. Although this is not normally the sizing parameter for the aircraft tail, its prevention could also be considered beneficial, provided other aircraft performance, as the landing or RTO (rejected take off) distance, is not significantly compromised.

When the aircraft is on ground, engines are at idle power and blades have a positive angle, and little drag is generated by the propellers. However, when propeller blades transition to negative angles (commanded by the Aircraft Power Levers), even though the engine is at idle, drag generated by propeller increases considerably. Therefore, a significant drag asymmetry is produced if two opposite engines do not transition to negative pitches simultaneously.

FIG. 1A illustrates that type of situation (A) where the outboard engine number (1) goes to negative pitch zone, while the opposite engine (engine number (4)) remains at low power positive pitch zone. The effect (B) of this situation (A) is that a thrust asymmetry is originated, which in turn produces a significant yaw moment at high speed of the aircraft.

FIG. 1B illustrates another type of situation (A) where one of the opposite engines, engine number (1) fails before or during the thrust reversal operation. The effect (B) of this situation (A) is again that a thrust asymmetry is created, which in turn produces a significant yaw moment at high speed of the aircraft. The same situation of FIG. 1B occurs if one of the engines is accidentally ordered to reverse thrust.

Therefore, a need has been detected in this technical field for a propeller control method that assures the simultaneous or symmetrical transition to reverse thrust in twin propellers.

SUMMARY OF THE DISCLOSURE

The present invention solves the above-mentioned problems, ensuring the simultaneous introduction of reverse thrust in opposite power plants of an aircraft during landing and/or taxing, and avoiding any cause of thrust asymmetry.

This is accomplished by:
- automatically synchronizing the transition of the propellers pitch to low settings or reverse thrust in opposite power plants,
- disabling the introduction of reverse in one power plants if the opposite one has failed, and
- in the case of four power plant aircrafts, sequencing the reverse transition: first in inboard power plants, then in outboard ones.

Therefore, an aspect of the invention refers to a method for controlling the aircraft propeller system during thrust reversal operation, wherein the propeller system comprises at least two opposite power plants, that is, two power plants symmetrically arranged with respect to the longitudinally axis of the aircraft, and wherein each power plant comprises a variable-pitch propeller and an engine to drive the propeller.

The method of the invention is based in that the transition to negative pitch of the aircraft propeller system is controlled from an aircraft flight control system, which may consist for example, in an aircraft primary flight computer.

In the method of the invention, it is checked whether each power plant, that is, the engine and/or propeller pitch control system, are ready for the transition to negative pitch, and then the flight control system is informed, for example by sending data, of a positive readiness condition detected in any one or both of the power plants.

More specifically, the following parameters or conditions are checked:
- any failure condition in the engine and/or in the propeller pitch control system,
- power delivered by each engine,
- propeller revolutions per minute. It is checked whether the propeller revolutions are below a predefined threshold.
- aircraft speed. It is checked whether the aircraft speed is below a predefined threshold.

When the pilot commands a thrust reversal order through the Aircraft Power Level to reverse two opposite power plants, this order is received in the flight control system, which then checks the information received about the readiness condition of both power plants for the transition to negative pitch. The flight control system will allow the thrust reversal, only when both power plants are ready for the transition to negative pitch. In that case, only the flight control system will instruct the aircraft propeller system to go to reverse thrust, positioning the blades in a negative pitch angle. If any one of the power plants is not ready for the transition to negative pitch, the flight control system would disable the thrust reversal.

Furthermore, according to the invention the operation condition of each of said power plants is checked before and during the thrust reversal operation to detect any power plant failure. A power plant failure is established if any component of the power plant does not meet predetermined operation nominal parameters. For example, the propeller pitch control device is checked, as to determine whether that control device is following the commanded position, and if there is a deviation between the commanded position and the real position, then a failure condition of that component is detected.

If a power plant failure is detected before a reversal order is received, then the flight control system is informed of that failure condition, and then the flight control system will disable the thrust reversal operation as long as the failure condition remains. If a failure condition is detected in one of said power plants while the propellers are being reversed, then the flight control system would instruct the opposite power plant to stop the transition to reverse, and transition back to positive pitch.

The invention can be easily retrofitted in any existing propeller driven aircraft platform, powered by turboprop, turbofan, open rotor or piston engines.

The use of the invention is especially advantageous in military transport aircrafts, which occasionally have to land in short provisional runways, wherein the operation of reversing the propellers thrust is of paramount importance for landing the aircraft.

BRIEF DESCRIPTION OF THE DRAWINGS

Preferred embodiments of the invention are henceforth described with reference to the accompanying drawings, in which:

FIGS. 1A and 1B show schematic representations of four turboprop aircrafts, representing different causes of yaw moments which may occur in an aircraft of the prior art during thrust reversal. The arrows represent thrust magnitude generated by the respective power plant, turboprops in this case. FIG. 1A represents a thrust asymmetry situation wherein one propeller transitions to the negative pitch zone while the opposite one remains at low power positive pitch zone. FIG. 1B represents another thrust asymmetry situation wherein one engine fails before or during the reverse operation.

FIG. 2 shows a schematic diagram illustrating the method according to the invention.

FIGS. 3A and 3B show similar representations of FIGS. 1A and 1B, and illustrate how the invention assures the simultaneous transition of opposite power plants to reverse their thrust (FIG. 3B), compared with a typical situation when a pilot fails to reverse the pitch of the propellers at the same time (FIG. 3A).

FIGS. 4A and 4B show similar representations of FIGS. 1A and 1B, and illustrate the corrective actions (FIG. 4B) taken by the method of the invention in the event of a failure of one of the power plants (FIG. 4A) during the thrust reversal operation.

DETAILED DESCRIPTION OF THE PRESENT DISCLOSURE

FIG. 2 illustrates the method of the invention which is based on the coordination between two or more aircraft propeller control systems, and a central flight control system. More specifically, in the example of FIG. 2, the aircraft propeller control system is implemented as a Full Authority Engine Control Systems (FADEC1, FADEC4) respectively for opposite power plants 1 and 4, and the flight control system is implemented as a Primary Flight Computer (PRIM).

According to the invention, the operation of thrust reversal is managed from the (PRIM) as a function of the information received from the (FADEC) of each power plant and/or the aircraft Power Lever position.

Each power plant, that is each engine of the aircraft and the associated variable-pitch propeller, are controlled by a dedicated (FADEC), in the example of FIG. 2, power plant (1) is controlled by its (FADEC1) and opposite power plant (4) is controlled by its (FADEC4). These FADEC's typically are implemented by an electronic programmable device, which is programmed to control for example, the engine speed and other operating parameters, as well as the propeller pitch. Additionally, each (FADEC) is configured to monitor the operating parameters of its respective power plant, and to check whether that power plant is ready for the transition to negative pitch, such as whenever a power plant is ready to transition to negative pitches, the respective (FADEC) sends data (5,6) to the (PRIM) containing the positive readiness condition.

That data (5,6) about the readiness condition of each power plant, is received and processed by the (PRIM), in such a manner that when a thrust reversal order is received from the aircraft Power Levels (not shown in the Figures), the (PRIM) checks the information received about the readiness condition of power plants (1,4) for the transition to negative pitch.

The (PRIM) is configured, that is, it is programmed to control the propellers transition to negative pitch from the flight control system, so that only when both power plants (1,4) are ready for the transition to negative pitch, then the (PRIM) sends simultaneously reversal instructions (7,8) respectively to (FADEC1) and (FADEC4) to transition to reverse thrust. In most of the cases, the (PRIM) will need to wait until both opposite power plants are ready for the transition before authorizing both of them to go to the negative pitch zone. In this way, it is assured that both opposite power plants (1,4) transition from positive blade pitch to negative pitch simultaneously in order to avoid a high drag asymmetry situation.

On the other hand, the (PRIM) would disable the thrust reversal if any one of the power plants is not ready for the transition to negative pitch.

The operation condition of each power plant is also checked during the thrust reversal operation, and if a failure condition is detected in anyone of said power plants, the (PRIM) would send instructions (9,10) respectively to (FADEC1) and (FADEC4) to stop the transition to reverse and transit back to positive pitch.

FIG. 3A shows a typical situation of the prior art when the pilot fails to put throttles at Ground Idle position simultaneously in inboard opposite power plants (2) and (3), which causes one external propeller to go to the negative pitch zone while the opposite remains at low power positive pitch zone, thereby causing hazardous thrust asymmetry. In that situation, the method of the invention, provides that the (PRIM) will not enable the thrust reversal avoiding the thrust asymmetry, and (PRIM) will wait until Power Level commands the reversal for both power plants, and only then (PRIM) will trigger the simultaneous transition to negative pitch on both power plants (2,3) (FIG. 3B).

If a power plant failure is detected by the respective (FADEC) before thrust reversal, the respective (FADEC) will inform the (PRIM) of this failure situation and (PRIM) will disable thrust reversal.

FIG. 4A shows another a situation of the prior art when one power plant fails (power plant 1) during the reversal operation causing a significant thrust asymmetry. In this situation, the (FADEC) of the failed power plant (1) will indicate the failed state to (PRIM), which in turn, will force the opposite power plant (power plant 4) operating within nominal parameters, out of reverse, and forcing that power plant to move to positive pitch values.

The (PRIM) would perform in the same manner in the case that an outboard power plant unexpectely transitions to a negative pitch zone causing high drag asymmetry. In this case, (PRIM) detects the asymmetry by observing the orientation of both outboard propeller pitches (positive and negative) and forces the power plant in reverse, out of it, and back to forward pitch.

FIGS. 3A-B and 4A-B represent a typical four turboprop configuration with outboard opposite power plants (1,4) and inboard opposite power plants (1,3). The method of the invention is preferably applied to the control of outboard opposite power plants (1,4), but it could also be applied to the control of inboard opposite power plants (1,3). Obviously, the invention can also be applied to the two power plants of a twin turboprop aircraft.

What is claimed:

1. A method for controlling an aircraft propeller system during thrust reversal, wherein the propeller system includes at least two power plants, each power plant having a variable-pitch propeller and an engine for the propeller to drive the same, the method for controlling an aircraft propeller system comprising the steps of:
checking whether each power plant is ready for a transition to negative pitch, and informing a flight control system of a detected positive readiness condition of any one of the at least two power plants;
receiving a thrust reversal order in the flight control system;
checking, in the flight control system, the readiness condition of the at least two power plants for the transition to negative pitch, and
controlling the propellers transition to negative pitch from the flight control system, when the at least two power plants are ready for the transition to negative pitch, the flight control system instruct the aircraft propeller system to reverse thrust,
wherein the aircraft propeller system includes a power plant control system for each power plant, and wherein data is exchanged between each power plant control system and the flight control system, for instructing the aircraft propeller system to reverse thrust, and wherein the flight control system simultaneously sends a reverse thrust instruction to both power plants control systems.

2. The method of claim 1 further comprising the steps of:
checking an operation condition of each of the power plants before the thrust reversal operation;
informing the flight control system of a detected failure condition of at least one of the two of the power plants if any of the power plants does not meet a predetermined operation parameter, and
disabling the thrust reversal operation.

3. The method of claim 2, wherein the predetermined operation parameter comprises the power supplied by the engine of the power plant.

4. The method of claim 1 further comprising the steps of:
checking an operation condition of each of the power plants during the thrust reversal operation, and
instructing the opposite power plant to stop the transition to reverse and transit back to positive pitch from the flight control system if a failure condition is detected in any one of the at least two power plants.

* * * * *